United States Patent
Savanah et al.

(10) Patent No.: US 12,107,955 B2
(45) Date of Patent: Oct. 1, 2024

(54) THRESHOLD DIGITAL SIGNATURE METHOD AND SYSTEM

(71) Applicant: nChain Licensing AG, Zug (CH)

(72) Inventors: Stephane Savanah, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/138,323

(22) Filed: Apr. 24, 2023

(65) Prior Publication Data

US 2023/0421375 A1 Dec. 28, 2023

Related U.S. Application Data

(63) Continuation of application No. 16/639,096, filed as application No. PCT/IB2018/055604 on Jul. 26, 2018, now Pat. No. 11,671,255.

(30) Foreign Application Priority Data

Aug. 15, 2017 (GB) .................................... 1713064
Aug. 15, 2017 (WO) .................. PCT/IB2017/054961
Dec. 11, 2017 (WO) .................. PCT/IB2017/057782

(51) Int. Cl.
*H04L 29/06* (2006.01)
*H04L 9/06* (2006.01)
(Continued)

(52) U.S. Cl.
CPC .......... *H04L 9/3066* (2013.01); *H04L 9/0637* (2013.01); *H04L 9/0643* (2013.01);
(Continued)

(58) Field of Classification Search
None
See application file for complete search history.

(56) References Cited

U.S. PATENT DOCUMENTS

| 5,764,767 A | 6/1998 | Beimel et al. |
| 6,363,481 B1 | 3/2002 | Hardjono |
| (Continued) | | |

FOREIGN PATENT DOCUMENTS

| CN | 101425902 A | 5/2009 |
| EP | 2538606 A1 | 12/2012 |
| (Continued) | | |

OTHER PUBLICATIONS

Dikshit Pratyush et al: "Efficient weighted threshold ECDSA for securing bitcoin wallet", 2017 ISEA Asia Security and Privacy (ISEASP), IEEE, Jan. 29, 2017 (Jan. 29, 2017), pp. 1-9 (Year: 2017).*

(Continued)

*Primary Examiner* — Andrew J Steinle
(74) *Attorney, Agent, or Firm* — Davis Wright Tremaine LLP

(57) ABSTRACT

Distributing first shares of a first secret value, known to a first participant, to second participants. The first shares encrypted using a private key and a public key that is elliptic curve generator point multiplied by the private key. A first threshold number of first shares being required to enable a second participant to determine the first secret value. A second share of a second secret value is received from each of the second participants. The second shares encrypted using a private key and a public key that is an elliptic curve generator point multiplied by the private key. A second threshold number of second shares being required to enable a participant other than the second participant to determine the second secret value. A third share of a third secret value formed from the second shares. A third threshold number of third shares being required to enable the third secret value to be determined.

32 Claims, 4 Drawing Sheets

(51) Int. Cl.
 *H04L 9/08* (2006.01)
 *H04L 9/30* (2006.01)
 *H04L 9/00* (2022.01)
(52) U.S. Cl.
 CPC .............. *H04L 9/085* (2013.01); *H04L 9/304* (2013.01); *H04L 9/50* (2022.05); *H04L 2209/56* (2013.01)

(56) References Cited

U.S. PATENT DOCUMENTS

| | | | |
|---|---|---|---|
| 6,810,122 | B1 | 10/2004 | Miyazaki et al. |
| 7,774,688 | B1 | 8/2010 | Teng et al. |
| 9,288,059 | B2 | 3/2016 | Nix |
| 9,450,938 | B1 | 9/2016 | Lampkins et al. |
| 9,489,522 | B1 | 11/2016 | El Defrawy et al. |
| 10,050,779 | B2 | 8/2018 | Alness et al. |
| 10,700,850 | B2 | 6/2020 | Ma et al. |
| 10,938,549 | B2 | 3/2021 | Ma et al. |
| 2003/0081789 | A1 | 5/2003 | Numao et al. |
| 2004/0179686 | A1 | 9/2004 | Matsumura et al. |
| 2009/0225986 | A1 | 9/2009 | Gennaro et al. |
| 2011/0202773 | A1 | 8/2011 | Ghouti et al. |
| 2011/0213975 | A1 | 9/2011 | Somniotti et al. |
| 2012/0254619 | A1 | 10/2012 | Dhuse et al. |
| 2014/0143369 | A1 | 5/2014 | Dobre |
| 2015/0213433 | A1 | 7/2015 | Khan |
| 2016/0028698 | A1 | 1/2016 | Antipa et al. |
| 2016/0335440 | A1 | 11/2016 | Clark et al. |
| 2017/0063559 | A1 | 3/2017 | Wallrabenstein |
| 2017/0221052 | A1 | 8/2017 | Sheng et al. |
| 2017/0345011 | A1 | 11/2017 | Salami et al. |
| 2018/0026798 | A1 | 1/2018 | Susella et al. |
| 2018/0117446 | A1 | 5/2018 | Tran et al. |
| 2018/0367298 | A1 | 12/2018 | Wright et al. |

FOREIGN PATENT DOCUMENTS

| | | |
|---|---|---|
| TW | 201424322 A | 6/2014 |
| WO | 2015160839 A1 | 10/2015 |

OTHER PUBLICATIONS

Ibrahim M H et al: "A robust threshold elliptic curve digital signature providing a new verifiable secret sharing scheme", Midwest Symposium on Circuits and Systems. Cairo, Egypt, Dec. 27-30, 2003;, Piscataway, NJ, IEEE, US, vol. 1, Dec. 27, 2003 (Dec. 27, 2003), pp. 276-280, XP010867444 (Year: 2003).*
Antonopoulos, "Mastering Bitcoin—Unlocking Digital Cryptocurrencies," O'Reilly Media, Inc., Dec. 20, 2014, 282 pages.
Ashwini et al., "Proactive Secret Sharing Using a Trivariate Polynomial," International Journal of Engineering Research and Application, 6(7): Jul. 2016, pp. 69-72.
Backes et al., "Asynchronous MPC with a Strict Honest Majority Using Non-equivocation," International Association for Cryptologic Research, Feb. 17, 2014, 35 pages.
Backes et al., "Asynchronous MPC with t < n=2 Using Non-equivocation," retrieved from https://eprint.iacr.org/eprint-bin/getfile. pl?entry=2013/745&version=20131117:013713&file=745.pdf, 2013, 31 pages.
Binu et al., "Threshold Multi Secret Sharing Using Elliptic Curve and Pairing," Mar. 31, 2016, 13 pages.
Bitcoin Forum, "Protocol or Paper for Joint Random Secret Sharing," Bitcoin Talk, retrieved from https://bitcointalk.org/index.php?topic=983665.5, Mar. 9, 2015, 3 pages.

Gennaro et al., "Robust Threshold DSS Signatures," Information and Computation 164, 2001, pp. 54-84.
Goldfeder et al., "Securing Bitcoin Wallets via a New DSA/ECDSA Threshold Signature Scheme," retrieved from https://www.cs.princeton.edu/~stevenag/threshold_sigs.pdf, 26 pages.
Goldfeder et al., "Securing Bitcoin wallets via threshold signatures," retrieved from http://www.cs.princeton.edu/~stevenag/bitcoin_threshold_signatures.pdf, Jun. 3, 2014, 11 pages.
Green et al., "Strength in Numbers. Threshold ECDSA to Protect Keys in the Cloud," Worcester Polytechnic Institute, retrieved from https://eprint.iacr.org/2015/1169.pdf, 2015, 19 pages.
Ibrahim et al., "A robust threshold elliptic curve digital signature providing a new verifiable secret sharing scheme," 2003 IEEE 46th Midwest Symposium on Circuits and Systems 1:276-280, Dec. 30, 2003, 6 pages.
International Search Report and Written Opinion for Application No. PCT/IB2018/055604, mailed Nov. 7, 2018, filed Jul. 26, 2018, 15 pages.
International Search Report and Written Opinion for Application No. PCT/IB2018/056094, mailed Dec. 4, 2018, filed Aug. 13, 2018, 14 pages.
International Search Report and Written Opinion mailed May 9, 2018, Patent Application No. PCT/IB2017/055497, 16 pages.
ITFIND, "ITFIND," retrieved from https://www.itfind.or.kr/Report01/200302/IITA/IITA-2381-016/IITA-2381-016.pdf, 2021, 3 pages.
Kate et al., "Distributed Key Generation for the Internet," retrieved from https://www.cypherpunks.ca/~iang/pubs/DKG.pdf, 10 pages.
Mann et al., "Two-Factor Authentication for the Bitcoin Protocol," retrieved from https:/eprint.iacr.org/2014/629.pdf, Nov. 4, 2014, 18 pages.
Maxwell, "Protocol or Paper for Joint Random Secret Sharing (JRSS) . . . ? " Bitcoin Forum, Jan. 15, 2018, 2 pages.
Miyazaki et al., "On Threshold RSA-Signing with No Dealer," International Conference on Information Security and Cryptology, 1999, 13 pages.
Müller, "A Short Note on Secret Sharing Using Elliptic Curves," Proceedings of the International Conference on Security and Cryptography, 2008, pp. 359-362.
Nakamoto, "Bitcoin: A Peer-to-Peer Electronic Cash System," Bitcoin, Oct. 31, 2008, https://bitcoin.org/bitcoin. pdf, 9 pages.
Pratyush et al., "Efficient Weighted Threshold ECDSA for Securing Bitcoin Wallet," ISEA Asia Security and Privacy, 2017, 9 pages.
Satoshi et al., "Connection Limits," Bitcoin Forum, Aug. 9, 2010, https://bitcointalk.org/index.php?topic=741.0;prev_next=prev, 2 pages.
Syta et al., "Keeping Authorities "Honest or Bust" with Decentralized Witness Cosigning," IEEE Symposium on Security and Privacy, 2016, 20 pages.
Tang, "ECDKG: A Distributed Key Generation Protocol Based on Elliptic Curve Discrete Logarithm," retrieved from http://citeseerx.ist.psu.edu/viewdoc/download?doi=10.1.1.124.4128&rep=rep1&type=pdf, Dec. 2001, 20 pages.
UK Commercial Search Report mailed Jan. 24, 2018, Patent Application No. GB1714660.6, 13 pages.
UK Commercial Search Report mailed Mar. 13, 2018, Patent Application No. GB1714660.6, 8 pages.
Zyskind et al., "Decentralizing Privacy: Using a Blockchain to Protect Personal Data," 2015 IEEE CS Security and Privacy Workshops, May 21, 2015, 5 pages.
Goldfeder, et al., "Securing Bitcoin Wallets via Threshold Signatures", Computer Science, Mathematics, 2014, 11 pages.
Ibrahim, Maged, "SecureCoin: A Robust Secure and Efficient Protocol for Anonymous Bitcoin Ecosystem", International Journal of Network Security, Jan. 2017, 19 pages.
Lee et al., "Share Renewal Scheme in Proactive Secret Sharing for Threshold Cryptosystem", Journal of KIISE Computer Systems and Theory, vol. 30, No. 5, Jun. 2003, 11 pages.

* cited by examiner

THRESHOLD DIGITAL SIGNATURE METHOD AND SYSTEM

CROSS REFERENCE TO RELATED APPLICATIONS

This application is a continuation of U.S. patent application Ser. No. 16/639,096, filed Feb. 13, 2020, entitled "THRESHOLD DIGITAL SIGNATURE METHOD AND SYSTEM," which is a 371 National Stage of International Patent Application No. PCT/M2018/055604, filed Jul. 26, 2018, which claims priority to United Kingdom Patent Application No. 1713064.2, filed Aug. 15, 2017, International Patent Application No. PCT/M2017/054961, filed Aug. 15, 2017, and International Patent Application No. PCT/M2017/057782, filed Dec. 11, 2017, the disclosures of which are incorporated herein by reference in their entirety.

BACKGROUND

This invention relates generally the security of data and computer-based resources. More particularly, it relates to cryptocurrencies and cryptography, and also to Elliptic Curve Cryptography, ECDSA, Threshold Cryptography. It can be used to advantage in relation to blockchain-implemented cryptocurrencies such as (for example) Bitcoin but is not limited in this regard, and can have wider applicability. The invention may, in one embodiment, be described as providing a distribution protocol for dealerless secret distribution.

SUMMARY

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration only, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception.

The concept of decentralisation is fundamental to the Bitcoin methodology. Decentralised systems provide the advantage that, unlike distributed or centralised systems, there is no single point of failure. Therefore, they offer an enhanced level of security and resilience. This security is further enhanced by the use of known cryptographic techniques such as Elliptic Curve Cryptography and ECDSA.

However, while the Bitcoin protocol itself has proved resilient to any significant attack at the time of filing the present application, there have been attacks on exchanges and wallets which supplement or build upon the Bitcoin network. As the value of Bitcoin increases, more incidents such as those involving Mt Gox and Bitfinex are likely to occur in standard centralised systems.

Thus, there is a need for a solution which further enhances the security of such systems. The invention provides such an advantage, amongst others.

The present invention provides method(s) and system(s) as defined in the appended claims.

According to an aspect of the present invention, there is provided a method of digitally signing a digital message by means of a private key of a public-private key pair of a cryptography system, to provide a digital signature which can be verified by means of a public key of the public-private key pair, the method comprising:

receiving at least a threshold number of partial signatures of said digital message, wherein each said partial signature includes a respective first part based on the message and a respective second part based on a respective share of the private key, wherein the private key is accessible to said threshold number of shares of the private key and is inaccessible to less than said threshold number of shares, wherein each said partial signature corresponds to a respective value of a first polynomial function such that the first polynomial function is accessible to said threshold number of partial signatures and is inaccessible to less than said threshold number of partial signatures; and determining said first polynomial function, by means of determining coefficients of the first polynomial function from a plurality of known values of said partial signatures, to effect digital signature of the message.

By determining said first polynomial function, by means of determining coefficients of the first polynomial function from a plurality of known values of said partial signatures, to effect digital signature of the message, this provides the advantage of improving the computational efficiency of the method.

The step of determining said first polynomial function may comprise executing an error correction algorithm, as well as enabling conventional decoders, such as used in electronic data communication such as ADSL, to be used.

This provides the advantage of enhancing accuracy of the digital signature process.

The step of determining said first polynomial function may comprise executing a Berlekamp-Welch decoding algorithm.

The step of determining said first polynomial function may comprise:

defining an error locator polynomial function and a second polynomial function, wherein the second polynomial function is a product of said first polynomial function and said error locator polynomial function, determining coefficients of said second polynomial function and said error locator polynomial function from a plurality of known values of said partial signatures, and determining said first polynomial function from said second polynomial function and said error detector polynomial function, to effect digital signature of the message.

According to another aspect of the present invention, there is provided a method of digitally signing a digital message by means of a private key of a public-private key pair of a cryptography system, to provide a digital signature which can be verified by means of a public key of the public-private key pair, the method comprising:

receiving at least a threshold number of partial signatures of said digital message, wherein each said partial signature includes a respective first part based on the message, a respective second part based on a respective share of the private key, wherein the private key is accessible to said threshold number of shares of the private key and is inaccessible to less than said threshold number of shares, and a respective third part corresponding to a respective value of a third polynomial function having a zero constant term, wherein the third polynomial function is accessible to said threshold number of shares of the third polynomial function and is inaccessible to less than said threshold number of shares, and wherein each said partial signature corresponds to a respective value of a fourth polynomial function such that the fourth polynomial function is accessible to said threshold number of partial signatures and is inaccessible to less than said threshold number of partial signatures; and determining the fourth polynomial function to effect digital signature of the message.

By providing a method in which each partial signature includes a respective third part corresponding to a respective value of a third polynomial function having a zero constant term, wherein the third polynomial function is accessible to said threshold number of shares of the third polynomial function and is inaccessible to less than said threshold number of shares, this provides the advantage of increasing the security of the method, by masking the private key and/or any ephemeral key used in the digital signature process, thereby minimising the risk of those keys from being determined by unauthorised parties.

The respective third part of at least one said partial signature may be added to the corresponding first part and the corresponding second part.

Each said partial signature may further include a respective fourth part based on a respective share of an ephemeral key, wherein the ephemeral key is accessible to said threshold number of said shares of said ephemeral key and is inaccessible to less than said threshold number of shares.

The cryptography system may be an elliptic curve cryptography system.

The method may further comprise:

distributing at least one respective first share of a first secret value, known to a first participant, to each of a plurality of second participants, wherein said first shares are encrypted by means of at least one private-public key pair comprising a private key and a public key being an elliptic curve generator point multiplied by the private key, wherein a first threshold number of first shares is required in order to enable a said second participant to determine the first secret value;

receiving, from each of a plurality of said second participants, at least one second share of a respective second secret value known to said second participant, wherein said second shares are encrypted by means of at least one private-public key pair comprising a private key and a public key being an elliptic curve generator point multiplied by the private key, and a second threshold number of second shares is required in order to enable a participant other than said second participant to determine the second secret value; and forming, from a plurality of said second shares, a third share of a third secret value, wherein a third threshold number of third shares is required in order to enable the third secret value to be determined.

By forming, from a plurality of said second shares, a third share of a third secret value, wherein a third threshold number of third shares is required in order to enable the third secret value to be determined, this provides the advantage of minimising access to the first and second secret values, thereby improving security of the method, since it is no longer necessary for private keys corresponding to the first and second secret values to be disclosed or stored in memory.

The first threshold value may be equal to said second threshold value and/or said second threshold value may be equal to said third threshold value and/or said third threshold value may be equal to said first threshold value.

The method may further comprise enabling encrypted communication between said first participant and each of a plurality of said second participants.

This provides the advantage of enabling dishonest participants to be more easily identified, by identifying the encryption key used encrypt inconsistent or suspicious shares.

The encrypted communication may be enabled by means of a respective common secret determined by said first participant and each of said plurality of second participants independently of said first participant.

This provides the advantage of enhancing the security of the system.

The first participant may update a private key and update a respective public key associated with each of said plurality of second participants, and each of said plurality of second participants may update a respective private key and a public key associated with said first participant.

The keys may be updated on the basis of data agreed between said first participant and the corresponding said second participant.

This further enhances the security of the system.

The first and second shares of said first and second secret values may be created by means of respective Shamir secret sharing schemes.

A plurality of said third shares may be respective values of a fifth polynomial function, and the third secret value can be determined by deriving the fifth polynomial function from said third threshold number of said values.

The method may further comprise communicating said first shares, multiplied by an elliptic curve generator point, to each of a plurality of said second participants.

The method may further comprise receiving at least one respective said second share, multiplied by an elliptic curve generator point, from each of a plurality of said second participants.

The method may further comprise verifying consistency of at least one said second share received directly from at least one said second participant with at least one said second share, multiplied by the elliptic curve generator point, received from at least one further said second participant.

This provides the advantage of enabling consistency of shares received from different second participants to be checked without disclosing private keys or shares, thereby enabling suspected untrustworthy participants to be ignored without comprising security of the method.

The method may further comprise updating said third secret value on the basis of said verification step.

This provides the advantage of improving the security of the system.

At least one said second share may be a value of a respective sixth polynomial function, and the corresponding second secret value can be determined by deriving the corresponding sixth polynomial function from the corresponding second threshold number of said values.

The method may further comprise receiving at least one coefficient of a respective said sixth polynomial function, multiplied by an elliptic curve generator point, from each of a plurality of said second participants.

This provides the advantage of enabling consistency of the first shares distributed by the first participant and the first shares, multiplied by the elliptic curve generator point, received from the second participants, to be verified, without compromising the security of the method, by reconstructing the second polynomial function.

The verification step may comprise reconstructing said sixth polynomial function, multiplied by the elliptic curve generator point, from said coefficients, multiplied by the elliptic curve generator point.

The method may further comprise verifying consistency of said first shares received directly from said first participant with said first shares multiplied by said elliptic curved generator point and received from a plurality of said second participants.

This provides the advantage of enabling potentially untrustworthy participants to be identified without compromising security of the method.

The method may further comprise verifying consistency of said first secret value with a plurality of said first shares, multiplied by said elliptic curve generator point, received from a plurality of said second participants.

The method may further comprise updating said third secret value on the basis of said verification step.

The verifying step may comprise obtaining from a plurality of said second shares, multiplied by the elliptic curve generator point, said second secret value, multiplied by the elliptic curve generator point, by means of a method which, when applied to said plurality of second shares, provides said second secret value.

The method may further comprise verifying consistency of said first shares multiplied by said elliptic curve generator point and received from one said second participant with said first shares multiplied by said elliptic curved generator point and received from another said second participant.

This also provides the advantage of enabling potentially untrustworthy participants to be identified without compromising security of the method.

The method may further comprise receiving from at least one said second participant at least one fourth share of a fourth secret value, having value zero, wherein said fourth share is encrypted by means of at least one private-public key pair comprising a private key and a public key being an elliptic curve generator point multiplied by the private key.

The method may further comprise the step of distributing respective fourth shares of a fourth secret value, having value zero, to a plurality of second participants, wherein said fourth shares are encrypted by means of at least one private-public key pair comprising a private key and a public key being an elliptic curve generator point multiplied by the private key.

This provides the advantage of enabling shares and or private keys to be updated, thereby enabling non-secure or inconsistent participants to be removed from participation.

The method may further comprise receiving from at least one third participant, different from the or each said second participant, at least one fourth share of a fourth secret value, having value zero, wherein said fourth share is encrypted by means of at least one private-public key pair comprising a private key and a public key being an elliptic curve generator point multiplied by the private key.

This provides the advantage of enabling an external oracle to be introduced to enable introduction of randomness, thereby improving the security of the system.

The method may further comprise verifying consistency of a plurality of said fourth shares, multiplied by said elliptic curve generator point, with a zero fourth secret value.

The method may further comprise updating said third secret value on the basis of said verification step.

The verifying step may comprise obtaining from a plurality of said fourth shares, multiplied by the elliptic curve generator point, said fourth secret value, multiplied by the elliptic curve generator point, by means of a method which, when applied to said plurality of fourth shares, provides said fourth secret value.

The method may further comprise forming, from said third share and said fourth share, a fifth share of said third secret value, wherein a fourth threshold number of fifth shares is required in order to enable the third secret value to be determined.

The message may be a blockchain transaction.

According to a further aspect of the present invention, there is provided a computer implemented system for carrying out a method as defined above.

BRIEF DESCRIPTION OF THE DRAWINGS

These and other aspects of the present invention will be apparent from and elucidated with reference to, the embodiment described herein.

An embodiment of the present invention will now be described, by way of example only, and with reference to the accompany drawings, in which.

DETAILED DESCRIPTION

Figure 1:
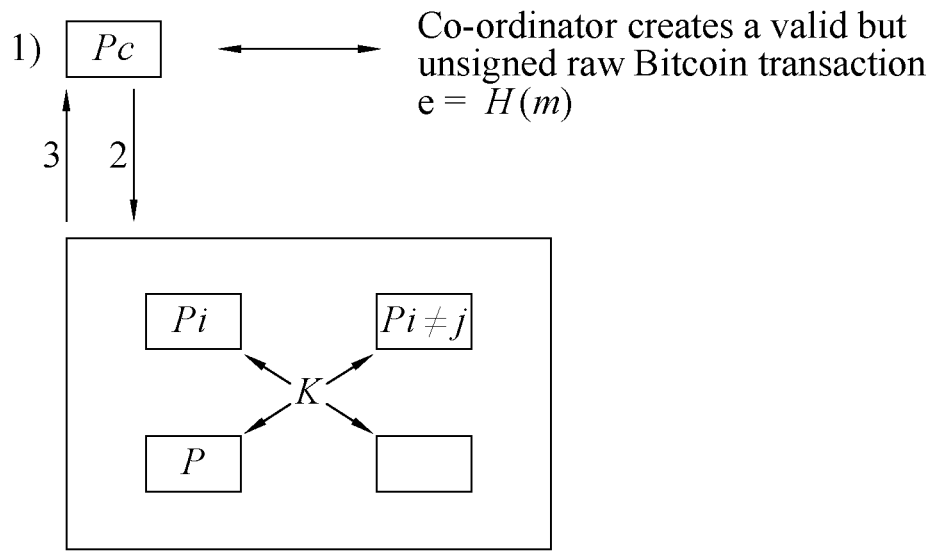
FIG. 1 illustrates part of an elliptic curve digital signature process embodying the present invention.

The invention provides a novel and inventive technique which can be used to enhance the security of computer systems and resources which need to be protected from unauthorised access. In this document, we present implementations, use cases and illustrations relating to cryptocurrency-related systems, including Bitcoin. However, it is important to note that the invention has a wider applicability and may be used to secure other types of systems and computer-based resources, and the invention is not limited in this regard.

Embodiments of the invention provide improved security by allowing for the addition of group-based threshold cryptography, coupled with the ability for deployment without a dealer. Embodiments also support the non-interactive signing of messages and provide for the division of private keys into shares that can be distributed to individuals and groups. Moreover, the invention provides a solution which creates a distributed key generation system that removes the necessity for any centralised control list minimising any threat of fraud or attack. In the application of threshold based solutions for DSA to ECDSA, the invention provides an entirely distributive signature system that mitigates against any single point of failure.

When used in relation to Bitcoin or an alternative, it can be coupled with retrieval schemes involving CLTV and multisig wallets to an infinitely extensible and secure means of deploying cryptocurrencies. Using group and ring based systems, the invention can be utilised to implement blind signatures against issued transactions.

The present application discloses a threshold based dealerless private key distribution system that is fully compatible with Bitcoin. The system builds on a group signature scheme that departs from the traditional individual signing systems deployed within Bitcoin wallets. As deployed, the system is both extensible and robust tolerating errors and malicious adversaries. The system is supportive of both dealer and dealerless systems and deployment in an infinitely flexible combination of distributions.

Individual parties can act as single participants or in combination as a dealer distributing slices of their protected key slice across machines for security and recoverability or in groups for the vote threshold based deployment of roles and access control lists.

There is no limit to the depth of how far a slice can be divided. This issue of complexity needs to be weighed against the distinct deployment. In this manner, as the record of signing and transactions can be hidden using this methodology from outside participants all with extensions to be presented in a subsequent paper even from those within the groups, embodiments of the invention introduce a level of anonymity and plausible deniability into Bitcoin transactions increasing the standard of pseudonymous protection to the users.

Ibrahim et al. [2003] developed an initial robust threshold ECDSA scheme. The following protocol is a further extension of what forms the elliptic curve form of the threshold DSS introduced by Gennaro et al. [1996].

TABLE 1

Definitions

| | |
|---|---|
| m | The message incl. Bitcoin transaction |
| e = H (m) | The hash of the message |
| CURVE | The elliptic curve and field deployed (summarised as E) |
| G | The elliptic curve base point. This point is a generator of the elliptic curve with large prime order n |
| n | Integer order of G such that n x G = Ø This is defined as the number of rational points that satisfy the elliptic function and represents the order of the curve E. |
| k | The threshold value for the key splitting algorithm. This value represents the number of keys needed to recover the key. The secret is safe for (k − 1) shares or less and hence can be retrieved with k shares. |
| dA | A private key integer randomly selected in the interval [1, (n − 1)] |
| QA | The public key derived from the curve point $Q_A = d_A \times G$ |
| x | Represents elliptic curve point multiplication by a scalar |
| J | The number of participants in the scheme. |

The use of group mathematics allows the creation a verifiable secret sharing scheme (VSS) that extends the work of Shamir [1979] in secret hiding and that of Feldman [1987] and Pedersen [1992] from RSA and DSA schemes so that it can be used within ECC and ECDSA-based Signature systems such as Bitcoin [Koblitz, 1998]. Embodiments of the present invention are tolerant against malicious adversaries, halting and are robust against eavesdropping.

The present disclosure begins with a presentation of a method to allow for the cooperative signing of ECDSA signatures where no one-party ever knows the private key. Moreover, it allows for the private key pairs to be updated and refreshed without the necessity of changing the private key. This is a significant technical advantage.

Existing solutions all require a trusted party. Utilising the present invention also allows the extension of the work of Chaum [1983] from a centralised system into a truly distributed manner of issuing electronic notes that can be settled directly on the Bitcoin Blockchain making the requirements for alternative Blockchains or sidechains obsolete.

With regard to the generator point G mentioned above, Bitcoin uses secp256k1. This defines the parameters of the ECDSA curve used in Bitcoin, and may be referenced from the Standards for Efficient Cryptography (SEC) (Certicom Research, http://www.secg.org/sec2-v2.pdf).

Matters of Trust

All existing systems require some level of trust. Until this time, Bitcoin has needed the protection of a private key using a secure system that is isolated from the world, which has proven difficult to achieve. Of note, systems where Bitcoin can be exchanged or stored, require trust in a centralised authority. The invention changes this requirement entirely distributing and decentralising the key creation and message signing processes within Bitcoin while not changing any of the core requirements of the protocol. The methodologies noted herein may be implemented without modifying the Bitcoin protocol and in fact, there is no way to determine whether this process has been deployed through the analysing of a signed message.

In creating a distributed signature scheme for Bitcoin, the invention allows for a group of people or systems to securely hold a key in a way that leaves no individual capable of generating a signature on their own. When extended, this scheme also allows for the secure recovery of each of the shares as well as the Bitcoin private key itself. The group generated signature is indistinguishable from that generated from the existing protocol. As such signature verification remains as if it was enacted through a single person signer using a standard transaction.

This increase in trust is achieved as the secret key is shared by a group of n participants or m groups of participants. A threshold number of participants is required for the signing of a transaction, and any coalition of participants or groups of participants that meet the minimum threshold can perform the signature operation. Importantly, this protocol can be enacted synchronously or as a batched process where individuals or groups can attempt to create a coalition of participants.

Background Work

Shamir [1979] first introduced a dealer based secret sharing scheme that allowed for a distributed management of keys. The problems associated with this scheme come from the necessity of trusting a dealer who cannot be verified. This form of the scheme is fully compatible with the present invention and can be used for group distribution of individual key slices that are created through the process noted herein.

Joint Random Secret Sharing (JRSS) [Pedersen, 1992]

The stated aim of this procedure is to create a method where a group of participants may collectively share a secret without any participant having knowledge of the secret.

Each participant selects a random value as their local secret and distributes a value derived from this using Shamir's secret sharing scheme (SSSS) with the group. Each participant then adds all the shares received from the participants, including its own. This sum is the joint random secret share. The randomness offered by a single honest participant is sufficient to maintain the confidentiality of the combined secret value. This state remains true even if all (n−1) other participants intentionally select non-random secret values).
Joint Zero Secret Sharing (JZSS) [Ben-or, 1988]

JZSS is like JRSS, with the difference that each participant shares 0 as an alternative to the random value. The shares produced using this technique aid in removing any potential weak points in the JRSS algorithm.

Desmedt [1987] introduced the concept of group orientated cryptography. This process allowed a participant to send a message to a group of people in a manner that only allowed a selected subset of the participants to decrypt the message. In the system, the members were said to be known if the sender must know them using a public key and the group is anonymous if there is a single public key for the group that is held independently of the members. The present invention integrates both methodologies and allows for known and anonymous senders and signers to exist within a group simultaneously.

The Present Invention

For any elliptic curve (CURVE) with a large order prime, and a base point $G \in CURVE(Z_p)$ of order n defined over the prime field $Z_p$, a system can be created that allows for the secure distribution of an ECC private key into key shares and its use without any participant being able to recreate the original private key from less than a threshold of shares.

For an unknown integer $d_A$ where $1 \leq d_A \leq (n-1)$ it is known that it is extremely difficult to calculate $d_A$ given $Q_A = d_A \times G$ [Kapoor, 2008].

The fundamental technique of the present invention is derived using the application of threshold cryptography. In this system, the ECDSA private key only exists as a potential and need never be recreated on any system. Each of these multiple shares is distributed to multiple participants $[p_{(i)}]$ in a manner that is extensible and allows for the introduction of both group and individual party signature formats. Thus, the signing process differs from that deployed within Bitcoin. In this process, a coordinating participant $p_{(c)}$ creates a transaction and a message signature that is distributed to the group. Each participant can vote on the use of its private key share by either computing a partial signature or passing.

In effect, passing would be equivalent to a no vote. The coordinating participant $p_{(c)}$ will collate the responses and combine these to form a full signature if they have received the minimum threshold number of partial signatures.

The coordinating participant $p_{(c)}$ can either accept the no vote and do the calculation based on a null value from the other party or can seek to lobby the party and convince them to sign the message. The protocol can be implemented with a set coordinator, or any individual or group can form this role and propose a transaction to the threshold group to be signed. The present invention extends the work of Ibrahim et al. [2003] providing a completely distributed ECDSA private key generation algorithm. The application also presents a distributed key re-sharing algorithm and a distributed ECDSA signing algorithm for use with Bitcoin. The key re-sharing algorithm may be used to invalidate all private key shares that currently exist in favour of new ones or for the reallocation of private key shares to new participants. This protocol extends to the sharing of not only the ECDSA private key but to private key shares as well. The consequences of this mean that shares can be constructed and voted on as a group process.

The present invention removes all requirements for a trusted third party to exist. Consequently, it is possible to create the new overlay and wallet for Bitcoin that is entirely compatible with the existing protocol and yet removes any remaining single points of failure while also allowing greater extensibility. The invention can also be extended to allow for the introduction of blind signatures.

As the present invention does not require a private key ever to be loaded into memory, the invention not only removes the need for a trusted third party but further removes a broad range of common attacks. The protocol is extensible allowing the required number of shares and the distribution of shares to be decided by the use case, economic scenario and risk requirements.

The present invention mitigates all side channel attacks and thus any cache timing attacks. This system takes the work of Gennaro et. al. [1996] and extends it from DSS such that it can be successfully used in any ECDSA based application.

ECDSA

Bitcoin uses ECDSA based on the secp256k1 curve. ECDSA was first standardised by NIST in 2003 [NIST] varying the requirements for Diffie-Hellman-based key exchanges using elliptic curve cryptography (ECC). The creation of ECC was particularly important due to the reduction in key size and processing power when compared to other public/private key systems. No sub-exponential time algorithm has been discovered for ECDLP. ECDLP is known to be intractable and refers to the elliptic curve discrete logarithm problem [Johnson, 2001].

The parameters used throughout the present application are documented in Table 1 provided above.

Security Considerations

The system is bounded by the security of ECDSA which is a current limitation within Bitcoin. At present, ECDSA remains secure if a private key can be securely deployed. The invention mitigates side channel attacks and memory disclosure attacks up to the threshold value requiring that the threshold number of participants have been compromised before the rekeying event. Additionally, any uncompromised threshold majority will be able to identify compromised participants at less than the threshold value.

Halting Problems

Service disruption is a form of attack that can be engaged in by a malicious adversary attempting to create a denial of service attack against the participants. This attack would require the participants to either receive invalid signatures that they would expend processing time analysing or through flooding network messages that would be subsequently dropped.

The requirement to encrypt messages to the participants using either ECC or signcryption based ECC mitigates this attack vector. Before an attacker can send invalid partially signed messages, they would need to have already compromised a participant, making this form of attack no longer necessary.

Randomness

Algorithm 2 provides a scenario where sufficient randomness is introduced even if (n−1) participants fail to choose random values. A possible addition to this protocol is the introduction of group oracles designed solely for the introduction of random values to the signing and rekeying process. In this optional scenario, each of the key slices can be generated using the same protocol. For instance, if there is an m of n primary slice requirement, each of the underlying key slices can also be generated and managed using an m' of n' threshold condition.

A participant using this system would be able to have the addition of an external Oracle that does nothing other than injecting randomness into the protocol. A user with m' key slices (where m'<n−1) could choose to recreate and process their signature solution based on the key slices they hold or may introduce an external Oracle that is unnecessary other than for the introduction of randomness.

Each slice could be likewise split for robustness and security. The key slice could be distributed such that the user has a slice on an external device such as a mobile phone or smartcard and a software program running on a computer such that the combination of sources would be required for them to create a partial signature.

It is important that a unique random ephemeral key $D_k$ is produced, based on a random value which is changed each time the key is used, or it would be possible to use the information to recreate the private key $d_A$.

Public Signing

The primary purpose of transactional signing using this protocol is to enable the distributed signing of the Bitcoin transaction. Any transaction that has not been published to the Blockchain can be maintained privately by the participants. Therefore, if a coordinating participant $p_{(c)}$ on any occasion has not been able to achieve the required level of votes to sign a transaction successfully, it is not necessary to create a new Bitcoin transaction. The ownership of any settled transaction remains secure if the key slices are themselves secure to the threshold value.

If the system is deployed well, the ability to compromise up to (k−1) participants leaves the system secure to attack below the threshold value. When coupled with a periodic rekeying protocol (Algorithm 2), embodiments of the present invention can withstand side channel attacks and memory disclosures.

Methods and Implementations of the Present Invention

As an embodiment of the present invention encrypts the secret information required to be sent between participants using ECC based on a hierarchical derivation, for example as disclosed in international patent publication WO 2017/145016", it is both possible and advisable to collate all messages into a single packet sent to all users such that validation can be done against potentially compromised or hostile participants when necessary.

Signature generation is proposed by a coordinating participant $p_{(c)}$. By default, any key slice can act as the coordinating participant and the requirements come down to the individual implementation of the protocol. The algorithms used are documented below, and a later section provides detail as to their deployment.

| Algorithm 1 | Key Generation |
|---|---|
| Domain Parameters (CURVE, Cardinality n, Generator G ) | |
| Input: | NA |
| Output: | Public Key $Q_A$ |
| | Private Key Shares $d_{A(1)}, d_{A(2)}, \ldots, d_{A(j)}$ |

For a threshold of k slices from (j) participants, a constructed key segment $d_{A(i)}$ is constructed which is associated with participant (i) and (j−1) participants nominated as participant (h) that are the other parties that participant (i) exchanges secrets with to sign a key (and hence a Bitcoin transaction).

In the scheme, j is the total number of participants where k≤j and hence h=j−1

Hence, there is a (k,j)—threshold sharing scheme.

The method for algorithm 1 follows:
1) Each participant $p_{(i)}$ of (j) where 1≤i≤j exchanges an ECC public key (or in this implementation, a Bitcoin address) with all other participants. This address is the Group identity address and does not need to be used for any other purpose.

It should be noted that this is a derived address and key based on a shared value between each of the participants from the process of international patent application WO 2017/145016.

2) Each participant $p_{(i)}$ selects a polynomial $f_i(x)$ of degree (k−1) with random coefficients in a manner that is secret from all other parties.

This function is subject to a first secret value in the form of the participant's secret $a_0^{(i)}$ that is selected as the polynomial free term. This value is not shared. This value is calculated using a derived private key, as disclosed in WO 2017/145016.

$f_i(h)$ is defined to be the result of the function, $f_{(x)}$ that was selected by participant $p_{(i)}$ for the value at point (x=h), and the base equation for participant $p_{(i)}$ is defined as the function:

$$f_{(x)} = \Sigma_{p=0}^{(k-1)} a_p x^p \bmod n$$

In this equation, $a_0$ is the secret for each participant $p_{(i)}$ and is not shared.

Hence, each participant $p_{(i)}$ has a secretly kept function $f_i(x)$ that is expressed as the degree (k−1) polynomial with a free term $a_0^{(i)}$ being defined as that participant's secret such that:

$$f_i(x) = \Sigma_{\gamma=0}^{(k-1)} a_\gamma x^\gamma \bmod n$$

3) Each participant $p_{(i)}$ encrypts first shares $f_i(h)$ to participant $P_{(h)}$ ∀h={1, . . . , (i−1), (i+1), . . . , j} using $P_{(h)}$'s public key [Wright, 2016] as noted above and exchanges the value for $P_{(h)}$ to decrypt. Each participant $P_i$ sets up a respective secure encrypted communication channel with each other participant $P_j$, for example by means of a method disclosed in international patent application WO 2017/145010.

It should be noted that that n×G=∅ for any basic point G∈E($Z_p$) of order n for the prime p. In the case of Bitcoin the values are:

Elliptic curve equation: $y^2 = x^3 + 7$
Prime modulo: $2^{256} - 2^{32} - 2^9 - 2^8 - 2^7 - 2^6 - 2^4$
=FFFFFFFF FFFFFFFF FFFFFFFF FFFFFFFF FFFFFFFF FFFFFFFF FFFFFFFE FFFFFC2F Base point=
04 79BE667E F9DCBBAC 55A06295 CE870B07 029BFCDB 2DCE28D9 59F2815B 16F81798 483ADA77 26A3C465 5DA4FBFC 0E1108A8 FD17B448 A6855419 9C47D08F FB10D4B8

Order=FFFFFFFF FFFFFFFF FFFFFFFF FFFFFFFE BAAEDCE6 AF48A03B BFD25E8C D0364141

As such for any set of integers B:{$b_i \in Z_n$} that can be represented as (b, $b_1, b_2$, . . . ), if bG=[$b_1 G + b_2 G +$ . . . ]mod p, then b=[$b_1 + b_2 +$ . . . ]mod n. Further, if bG=[$b_1 b_2$ . . . ]G mod p then b=[$b_1 b_2$ . . . ] mod n.

Given that $Z_n$ is a field and Lagrange interpolation modulo n can be validly done over the values selected as ECC private keys, there is a condition which leads to the conclusion that Shamir's Secret Sharing Scheme SSSS [5] can be implemented over $Z_n$.

4) Each participant $P_{(i)}$ broadcasts the values below to all participants.

$$a_\kappa^{(i)} G \forall \kappa = \{0, \ldots, (k-1)\} \quad \text{a)}$$

$$f_i(h) G \forall h = \{1, \ldots, j\} \quad \text{b)}$$

The value associated with the variable h in the equation above can either be the position of the participant $P_{(h)}$ such that if participant $P_{(h)}$ represents the third participant in a scheme, then h=3 or equally may represent the value of the ECC public key used by the participant as an integer. Use cases and scenarios exist for either implementation. In the latter implementation, the value h={1, . . . , j} would be replaced by an array of values mapped to the individual participant's utilised public key.

5) Each participant $P_{(h \neq i)}$ verifies the consistency of the received shares with those received from each other participant.
That is: $\Sigma_{k=0}^{(k-1)} h^k a_k^{(k)} G = f_i(h) G$
And that $f_i(h)G$ is consistent with the participant's share.

6) Each participant $P_{(h \neq i)}$ validates that the share owned by that participant ($P_{h \neq i}$) and which was received is consistent with the other received shares:

$$a_0^{(i)} G = \sum_{h \in B} b_h f_i(h) G \quad \forall P_{(h \neq i)}$$

In effect, this step consists of carrying out, on the elliptic curve encrypted versions of the shares $f_i(h)$ (i.e. $f_i(h)G$), the operation which, if carried out on the unencrypted versions of $f_i(h)$, would recover the secret value $a_0^{(i)}$, to recover G $a_0^{(i)}$. In the case of a Shamir secret sharing scheme, therefore, the coefficients $b_h$ represent the Lagrange interpolation coefficients necessary to recover the secret from its corresponding shares.

If this is not consistent, the participant rejects the protocol and starts again. In addition, because each participant $P_j$ communicates with participant $P_i$ by means of its own encrypted communication channel, it is possible to identify which participant Pj is associated with any inconsistent shares.

7) Participant $p_{(i)}$ now either calculates their share $d_{A(i)}$ as:

$$\text{SHARE}(p_{(i)}) = d_{A(i)} = \Sigma_{h=1}^{j} f_h(i) \mod n$$

Where $\Sigma_{h=1}^{j} f_h(i) \mod n$ are second shares in respective second secret values $a_0$ received from each participant $P_{(h \neq i)}$
And where: $\text{SHARE}(p_{(i)}) \in Z_n$ and $d_{A(j)}$
Where: $Q_A = \text{Exp-Interpolate} (f_1, \ldots, f_j) \triangleright [=G \times d_A]$
And where the operation Exp-Interpolate( ) is defined as the operation which recovers the elliptic curve encrypted secret from the elliptic curve encrypted shares. This operation can be defined in more detail as follows.

If $\{\omega_1, \ldots, \omega_j\}(j \geq (2k-1))$ is a set where at most (k-1) values are null and the remaining values are of the form $G \times \alpha_i$, and each $\alpha_i$ exists on some (k-1)-degree polynomial $H(\bullet)$, then $\theta = G \times H(0)$.

This value can be computed by $\theta = \Sigma_{i \in V} \omega_i \times \lambda_i = \Sigma_{i \in V}(G \times H(i)) \times \lambda_i$ $\beta$ for which V is a (k)-subset of the correct $\omega_i$ values and further, $\lambda_i$ represent the resultant Lagrange interpolation coefficients. The polynomial can be computed by using the Berlekamp-Welch decoder.
Return $(d_{A(i)}, Q_A)$
Where $d_{A(i)}$ is third share of a third secret value.
Participant $p_{(i)}$ now uses the share in calculating signatures. This role can be conducted by any participant or by a party $p_{(c)}$ that acts as a coordinator in the process of collecting a signature. The participant $p_{(c)}$ can vary and does not need to be the same party on each attempt to collect enough shares to sign a transaction.

Hence private key shares $d_{A(i)} \leftarrow Z^*_n$ have been created without knowledge of the other participant's shares.

| Algorithm 2 | Updating the private key |
|---|---|
| Input: | Participant $P_i$'s share of private key $d_A$ denoted $d_{A(i)}$. |
| Output: | Participant $P_i$'s new private key share $d_{A(i)}$. |

Algorithm 2 can be used to both update the private key as well as to add randomness into the protocol.

Using keys of the format of international patent publication WO 2017/145016, this process can lead to the recalculation of hierarchical sub-keys without the reconstruction or even calculated existence of the private keys. In this manner, it is possible to construct hierarchies of Bitcoin addresses and private key slices that when correctly deployed will remove any large-scale fraud or database theft as has occurred in the past.

1) Each participant selects a random polynomial of degree (k−1) subject to zero as its free term. This is analogous to Algorithm 1 but that the participants must validate that the selected secret of all other participants is zero.

It should be noted that: $\emptyset G = nG = 0$ where 0 is a point at infinity on the elliptic curve.

Using this equality, all active participants validate the function:

$$a_0^{(i)} G = \emptyset \forall i = \{1, \ldots, j\}$$

See Feldman (1987) for an analogy.
Generate the zero share: $z_i \leftarrow Z^*_n$
2) $d_{A(i)}' = d_{A(i)} + z_i$
3) Return: $d_{A(i)}'$ The result of this algorithm is a new key share that is associated with the original private key. A variation of this algorithm makes the ability to both increase the randomness of the first algorithm or to engage in a re-sharing exercise that results in new key slices without the need to change the bitcoin address possible. In this way, the invention allows a group to additively mask a private key share without altering the underlying private key. This process can be used to minimise any potential key leakage associated with the continued use and deployment of the individual key shares without changing the underlying bitcoin address and private key.

| Algorithm 3 | Signature Generation |
|---|---|
| Domain Parameters: | CURVE, Cardinality n, Generator G |
| Input: | Message to be signed e = H (m) |
| | Private Key Share d $_{A(i)} \in Z_n^*$ |
| Output: | Signature (r,s) $\in Z_n^*$ for e = H (m) |

A) Distributed Key Generation
1) Generate the ephemeral key shares using Algorithm 1:

$$D_{k(i)} \leftarrow Z^*_n$$

2) Generate Mask shares using Algorithm 1:

$$\alpha_i \leftarrow Z_n$$

3) Generate Mask shares with Algorithm 2:

$$b_i, c_i \leftarrow Z_n^2$$

By executing Algorithm 2 twice using polynomials of degrees 2(k−1). The shares created in these protocols are denoted as $$(\beta_1, \ldots, \beta_j) \xleftrightarrow{(2(k-1),j)} \beta \bmod n \text{ and } (c_1, \ldots, c_j) \xleftrightarrow{(2(k-1),j)} c \bmod n.$$

These are used as additive masks. The polynomial must be of degree 2(k−1) because the numbers being masked involve the products of two polynomials of degree (k−1). This doubles the required number of shares needed to recover the secret.

The shares of b and c are then kept secret by the participants.

B) Signature Generation
4) e=H (m) Validate the hash of the message m
5) Broadcast $$\vartheta_i = D_{k(i)} \alpha_i + \beta_i \bmod n$$

And $$\omega_i = G \times \alpha_i$$

6) μ=Interpolate ($\vartheta_1, \ldots, \vartheta_n$)mod n
   ▷ [=$D_k \alpha$ mod $n$]

Where the operation p=Interpolate ($v_1, \ldots, v_j$)mod n is defined as the operation which recovers the secret from the shares. This operation can be defined in more detail as follows.

Where $\{v_1, \ldots, v_n\}(j \geq (2k-1))$ forms a set, such that at most of (k−1) are null and all the residual values reside on a (k−1)-degree polynomial F(•), then μ=F(0).

7) θ=Exp–Interpolate($\omega_1, \ldots, \omega_n$)
   ▷ [=$G \times \alpha$]

8) Calculate $(R_x, R_y)$ where $r_{x,y} = (R_x, R_y) = \theta \times \mu^{-1}$
   ▷ [=$G \times D_k^{-1}$]]

9) r=$r_x$=$R_x$ mod n
   If r=0, start again (i.e. from the initial distribution)

10) Broadcast $S_i = D_{k(i)}(e + D_{A(i)} r) + C_i$ mod n $$s_i = D_{k(i)}^{-1}(e + d_{A(i)} r) + c_i \bmod n$$

11) S=Interpolate($s_i, \ldots, s_n$) mod n S=Interpolate ($s_1, \ldots, s_n$)
    If s=0 redo Algorithm 3 from the start (A.1).

12) Return (r,s)

13) In Bitcoin, reconstruct the transaction with the (r,s) pair to form a standard transaction.

Figure 7:
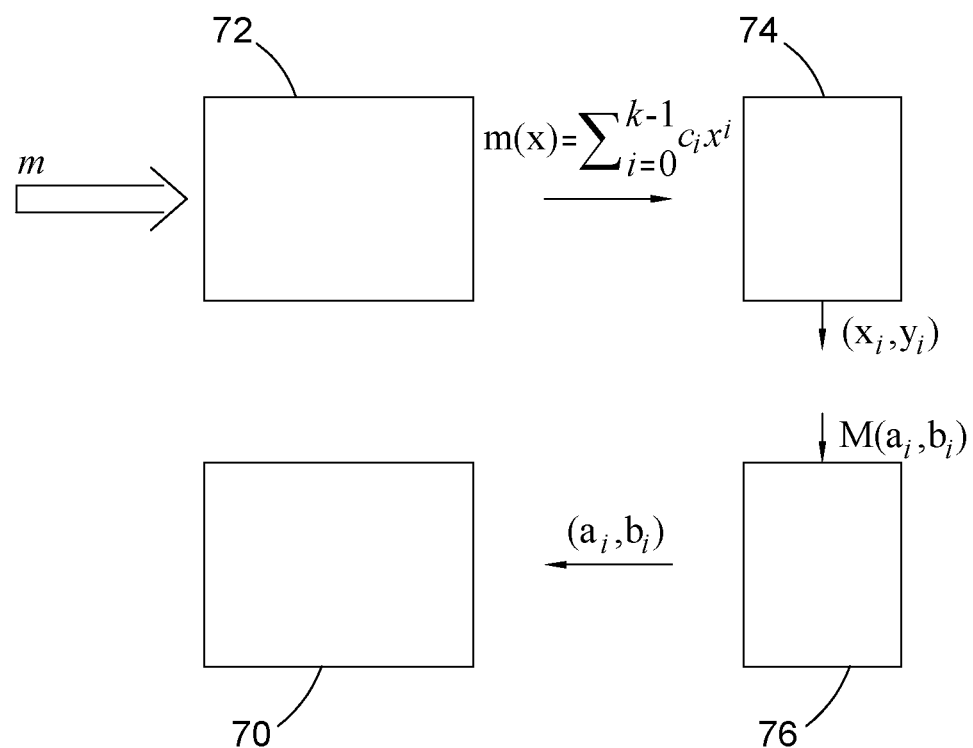
FIG. 7 shows a Berlekamp-Welch decoder for carrying out a method embodying the present invention.

FIG. 7 shows a novel use of a conventional Berlekamp-Welch decoder 70 to obtain a polynomial function representing partial signatures of a digital message.

In conventional use of the Berlekamp-Welch algorithm for correcting errors in transmitted data, a message m is divided into a series of k bytes at an encoder 72, and each byte $c_0, c_1, \ldots c_{k-1}$ is encoded as an integer modulo p. The message is then represented by a polynomial function:

$$m(x) = \sum_{i=0}^{k-1} c_i x^i$$

The value of polynomial function m(x) is then determined for a number of known values of x to generate a series of (x, y) pairs, which are then transmitted by a transmitter 74 to a receiver 76.

The data M received at the receiver 76 (i.e. the received message) comprises pairs $(a_1, b_1, \ldots a_n, b_n)$ corresponding to points on the polynomial function representing the original message $$P(x) = m(x) = \sum_{i=0}^{k-1} c_i x^i$$

If it is assumed that some of the transmitted (x, y) pairs have been corrupted during transmission, then an error locator polynomial function can be defined as follows:

$E(a_i)=0$, when $P(a_i) \neq b_i$; otherwise $E(a_i) \neq 0$

If a product polynomial function $Q(a_i)$ is defined as $Q(a_i) = b_i E_i(a_i)$

Then for each received $(a_i, b_i)$ pair, regardless of whether the value of $b_i$ has become has been corrupted $Q(a_i) = b_i E_i(a_i) = P(a_i) E_i(a_i)$, since $E(a_i)=0$, when $P(a_i) \neq b_i$ For n known values of $(a_i, b_i)$, since $E(a_i)$ is a polynomial function of degree e, and $P(a_i)$ is a polynomial function of degree (k−1)), then $Q(a_i)$ is a polynomial function of degree (e+k−1). The known values of $(a_i, b_i)$ can therefore be expressed as the linear system:

$$Q(a_i) = \sum_{j=0}^{e+k-1} q_i a_i^j = b_i \sum_{j=0}^{e} e_j a_i^j = b_i E_i(a_i)$$

The linear system contains 2e+k−1 unknown terms (e from E(x) and e+k−1 from Q(x)), as a result of which the coefficients of $Q(a_i)$ and $E(a_i)$ can be determined if n≥2e+k−1. If $Q(a_i)$ and $E(a_i)$ can be determined, it is possible to determine $P(a_i)$ to recover the original message m(x).

It can therefore be seen that the Berlekamp-Welch decoder 70 receives as inputs pairs representing points on a polynomial function, and outputs the polynomial function. The decoder 70 can therefore be used as a replacement for Lagrange interpolation in the present invention to determine a polynomial function from a threshold number of shares represented by that polynomial function.

The Model—Threshold ECDSA (T.ECDSA)

In accordance with an embodiment of the invention, the system of n groups or individuals that are designated as participants is allowed for. Each player can be an individual as a sole participant or a group or combination of the above. Participant $p_{(i)}$ may be mapped against an identity using a commonly derived public key calculation or participant $p_{(i)}$ may be left as a pseudonymous entity with the public key of the participant used only for this protocol without being mapped back to the individual.

The invention introduces a dedicated broadcast channel allowing for the recognition of other participants as a valid player and a member of the scheme while simultaneously allowing members within the group to remain unidentified. When a message is broadcast from participant $p_{(i)}$, the members within the group will recognise the message as coming from an authorised party without necessarily being able to identify the end user or individual that is associated with the key. It is also possible to link the identity of the key to an individual if such a system were warranted.

The process flow is summarised as follows:
In FIG. 1:
Step 1)
See FIG. 1
Step 2) Pc sends the raw transaction to the Group. If this validates (i.e. the raw transaction matches the Hash to be signed), the participant votes by signing it.
Step 3) If Yes, each Participant returns the partially signed transaction.

Figure 2:
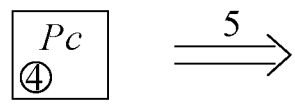
FIG. 2 illustrates a further part of the elliptic curve digital signature process.

See FIG. 2

Step 4) Pc (or any other Participant) reconstructs the complete signature if a threshold of partially signed transactions are received.

Step 5) Pc broadcasts the transaction as a signed Bitcoin transaction.

The calculation of a message signature can be initiated by an individual who does not change, or through a temporary broadcasting party. The role of the protocol coordinator can be conducted by any participant or by a party $p_{(c)}$ that acts as a coordinator in the process of collecting a signature.

Key Generation

A modified ECDSA key generation algorithm is used to make a signature scheme that is fully distributed. In this scheme, the private key is communally selected by the distributed group using a combination of hidden random secrets.

The threshold key derivation algorithm is given in Algorithm 1.

The algorithm is extensible, and each step of the algorithm can be executed by every participant synchronously without a dealer or in groups or individuals or dealers. This implementation is fully compatible with the current Bitcoin protocol. Any signatories will appear to an outside observer or verifier as if they were signed in the standard manner. Consequently, there is no way to tell if a key has been generated in the standard format or using the enhanced protocol of the present invention.

Signature Generation

The concept of threshold signature generation is described in [Shamir, 1979]. Algorithm 3 is related to a procedure reported in [Feldman, 1987] that was based on DH based systems and has been modified to allow for ECDSA.

The present invention extends this process such that it is fully compatible with both Bitcoin transaction processing and signing. This also extends to multisig transactions where it is possible to require distributed keys for each of the multiple signatures that are necessary.

Re-Sharing the Private Key

This process can be extended to introduce an entirely distributed key re-sharing scheme. This re-distribution is completed when the current participants execute one round of Algorithm 2 adding the resulting zero-share to the participant's private key share. The new shares will be randomly distributed if one participant has introduced a random value.

This process allows additive masking of the private key share while not altering the actual private key.

Threshold ECDSA Signature Derivation

The threshold ECDSA signature creation system is derived using the ideas related to the threshold DSS signature generation protocol found in [Feldman, 1987] which followed the scheme developed in [Shamir, 1979].

Verification

The present invention allows for the off-line signing and verification of messages before any value is transferred to a known bitcoin address. Each of the parties can calculate and validate an address independently using the processes noted in Algorithm 1. Hence, all participants can be aware that their share is valid before any exercise that requires funding a Bitcoin address. For this process, although verification schemes are possible, they are unnecessary. Any threshold participant who chooses to send an invalid signature slice is in effect voting for the negative. That is, a vote to not sign the message and hence not complete the transaction in bitcoin is achieved from inaction. The impact is as if they did not sign a message at all.

Algorithm 2 provides a method where participants can have their share consistency verified. If a threshold of non-malicious participants has been maintained, it is possible to exclude any known malicious participants on rekeying. Hence key slices can be updated while not allocating fresh slices to known malicious participants, allowing for the refreshing of the key in a manner that also allows for reallocations of slices.

In environments where trust is particularly scarce and malicious adversaries are to be expected as the norm, it is possible to further enhance the robustness of the verification process increasing the ability to defend against an j/2 passive and an j/3 active adversary [Ben-Or, 1989; Rabin, 1988] when completing secure multiparty computations.

The robustness of the system can be enhanced using the additional process:

1. Let $D_a$ be the secret shared among the j participants on a polynomial $A(x)$ of degree $(k-1)$.
2. Separately participants $p_{(i)}$ have a share $D_{a(i)}$ of $D_a$ and $D_{a(i)}G \forall (i \in 0, \ldots, j)$ which are made available to the group.
3. All participants next share a secret b using Algorithm 2 such that each participant $p_{(i)}$ has a new hidden share $D_{b(i)}$ of $D_b$ on a polynomial of degree $(k-1)$.
It should be noted that $D_{b(i)} = \Sigma_{h=1}^{j} D_{b(i)}^{(h)}$, where $D_{b(i)}^{(h)}$ is the sub-share submitted to participant $p_{(i)}$ from participants $p_{(h \neq i)}$.
4. The participants use Algorithm 2 so that each participant $p_{(i)}$ has a new hidden share $Z_{(i)}$ on a polynomial of degree $(2k-1)$ of which the free term equals zero.
5. Each participant $p_{(i)}$ publishes $D_{a(i)}D_{b(i)}^{(h)}G \forall (h \in 0, \ldots, j)$ and $D_{a(i)}D_{b(i)}G$ to the group.
6. Each participant $p_{(h \neq i)}$ can verify the validity of $D_{a(i)}D_{b(i)}^{(h)}G$ as they have $D_{b(i)}^{(h)}$ and $D_{a(i)}G$
7. Also, participant $p_{(i)}$ can further verify that $D_{a(i)}D_{b(i)}G = \Sigma_{h=1}^{j} D_{a(i)}D_{b(i)}^{(h)}$.

Any participants can determine if other participants are acting maliciously with this system.

Distributed Key Generation

It is possible to complete the implementation of both distributed autonomous corporations (DACs) and distributed autonomous social organisations (DASDs) in a secure manner through this scheme.

It has been shown that any k members can represent such a group through an identification scheme (including through digital certificates signed and published by a certification authority) and that any k members can construct a digital signature on behalf of the organisation. This system extends to the signing of Bitcoin transactions that verify without any distinguishing feature and provide for the transfer of value. These authentication schemes are proven secure.

Method and Implementation

As the protocol encrypts the secret information required to be sent between participants using ECC based on the technique disclosed in international patent application WO 2017/145016, it is both possible and advisable to collate all messages into a single packet sent to all users such that validation can be done against potentially compromised or hostile participants when necessary.

Signature generation is proposed by a coordinating participant $p_{(c)}$. By default, any key slice can act as the coordinating participant and the requirements come down to the individual implementation of the protocol. On the creation of a valid raw transaction by $p_{(c)}$, the transaction and the message hash of the transaction are broadcast to all participants $p_{(i \neq c)}$ using an encrypted channel.

A. Generate Ephemeral Key Shares $D_{k(i)}$

The participants generate the ephemeral key $D_k$, uniformly distributed in $Z^*_n$, with a polynomial of degree (k−1), using Algorithm 1, which creates shares $$(D_{k(1)}, \ldots, D_{k(j)}) \xleftrightarrow{((k-1),j)} D_k \bmod n.$$

Shares of $D_k$ are maintained in secret being held individually by each participant.

B. Generate Mask Shares $\alpha_i$

Each participant generates a random value $\alpha_i$, uniformly distributed in $Z^*_n$ with a polynomial of degree (k−1), using Algorithm 1 to create shares $$(\alpha_1, \ldots, \alpha_j) \xleftrightarrow{((k-1),j)} \alpha \bmod n.$$

These are used to multiplicatively mask $D_{k(i)}$.

The shares of $\alpha_i$ are secret and are maintained by the corresponding participant.

C. Generate Mask Shares $\beta_i, c_i$

Execute Algorithm 2 twice using polynomials of degrees 2(k−1).

Denote the shares created in these protocols as $$(\beta_1, \ldots, \beta_j) \xleftrightarrow{(2(k-1),j)} \beta \bmod n \text{ and } (c_1, \ldots, c_j) \xleftrightarrow{(2(k-1),j)} c \bmod n.$$

These are used as additive masks. The polynomial must be of degree 2(k−1) because the numbers being masked involve the products of two polynomials of degree (k−1). This doubles the required number of shares needed to recover the secret.

The shares of b and c are to be kept secret by the participants.

D. Compute Digest of Message m: e=H(m)

This value is checked against the received hash of the transaction obtained from $p_{(c)}$.

E. Broadcast $v_i = D_{k(i)} \alpha_i + \beta_i \bmod n$ and $\omega_i = G \times \alpha_i$ Participant $P_i$ broadcasts $v_i = D_{k(i)} \alpha_i + \beta_i \bmod n$ and $\omega_i = G \times \alpha_i$.

If no response is received from $P_i$, the value used is set to null.

It should be noted that:

$$(v_1, \ldots, v_j) \xleftrightarrow{(2(k-1),j)} D_k \alpha \bmod n$$

F. Compute $\mu$=Interpolate $(v_1, \ldots, v_j) \bmod n$

Interpolate( ) [2]:

Where $\{v_1, \ldots, v_n\}(j \geq (2k-1))$ forms a set, such that at most of (k−1) are null and all the residual values reside on a (k−1)-degree polynomial F(•), then $\mu$=F(0).

The polynomial can be computed using ordinary polynomial interpolation. The function "Interpolate( )" is the Berlekamp-Welch Interpolation [2] and is defined as an error correcting algorithm for BCH and Reed-Solomon codes. This is described in more detail at http://mathworld.wolfram.com/LagrangeInterpolatingPolynomial.html and also at Whittaker, E. T. and Robinson, G. "Lagrange's Formula of Interpolation." § 17 in The Calculus of Observations: A Treatise on Numerical Mathematics, 4th ed. New York: Dover, pp. 28-30, 1967, and at https://jeremykun.com/2015/09/07/welch-berlekamp/G.

G. Compute $\theta$=Exp-Interpolate $(\omega_1, \ldots, \omega_j)$

Exp-Interpolate( ) [10]:

If $\{\omega_1, \ldots, \omega_j\}(j \geq (2k-1))$ is a set where at most (k−1) values are null and the remaining values are of the form $G \times \alpha_i$, and each $\alpha_i$ exists on some (k−1)-degree polynomial H(•), then $\theta = G \times H(0)$.

This value can be computed by $\theta = \Sigma_{i \in V} \omega_i \times \lambda_i = \Sigma_{i \in V} (G \times H(i)) \times \lambda_i \beta$ for which V is a (k)-subset of the correct $\omega_i$ values and further, $\lambda_i$ represent the resultant Lagrange interpolation coefficients. The polynomial can be computed by using the Berlekamp-Welch decoder.

H. Compute $(R_x, R_y) = \theta \times \mu^{-1}$

I. Assign $r = R_x$ Mod q if r=0, go to Step A.

Each participant $p_{(i)}$ computes their slice of $r_i$ in step J. The coordinator $p_{(c)}$ can use these values to reconstruct s if they have received a threshold number of responses.

J. Broadcast $s_i = D_{k(i)}^{-1}(e + d_{A(i)} r) + c_i \bmod n$

If a response is not solicited/received from $P_i$, the values used are set to null.

It should be noted that Interpolate $$(s_1, \ldots, s_j) \xleftrightarrow{(2(k-1),j)} D_k^{-1}(e + d_A r) \bmod n.$$

K. Compute s=Interpolate $(s_1, \ldots, s_n) \bmod n$

If s=0, go to step I.

Where the function Interpolate( ) is defined above.

Each participant $p_{(i)}$ computes their slice of $s_i$ in step J. The coordinator $p_{(c)}$ can use these values to reconstruct s if they have received a threshold number of $s_i$ responses.

L. Return (r, s)

M. Replace the Signature Section of the Raw Transaction and Broadcast this to the Network.

Dealer Distribution of Slices

The embodiments described above can be made much more flexible through the introduction of group shares. In this manner, the allocation of shares can be split between a dealer, multiple dealers, a group containing no dealers or any possible combination of the above in any level of hierarchical depth.

By replacing the value $d_A$ and its corresponding key slice $d_{A(i)}$ with a value derived using the same algorithm, hierarchies of votes can be created. For example, a scheme can be created that simultaneously integrates shares that are derived from:

1) Dealer based distributions
2) Multiple Dealers
3) No Dealer

Hence, the scheme is extensible and can be made to incorporate any business structure or organisational system.

The allocation of slices is also extensible. Deploying an uneven allocation process allows weighting on shares to be added. In the scheme displayed in FIG. 3, it is possible to create a hypothetical organisation with five top-level members. This, however, does not require setting the value of n=5 equally weighted shares. In this hypothetical organisation, it is possible to set the voting structure for the top-level schema as follows:

| Threshold(0) | 61 Shares |
| --- | --- |
| $D_{LO_2}$ | 15 Shares |
| $D_{L1}$ | 15 Shares |

-continued

| | |
|---|---|
| $D_{L2}$ | 15 Shares |
| $D_1$ | 45 Shares |
| $D_2$ | 10 Shares |

Here n=100 has been set. As noted this is an arbitrary value that can reflect any organisational structure. The organisation in FIG. 3 allows for a veto scenario ($D_1$) and through the introduction of multi-layered allocation allows for any voting structure that can be imagined.

Figure 3:
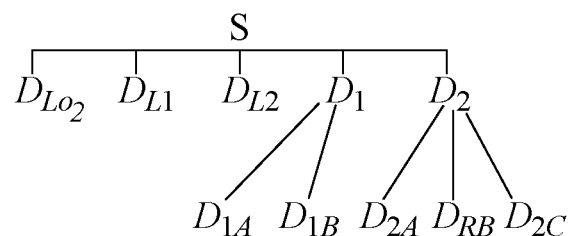
FIG. 3 illustrates a reconstructive hierarchy of shares distributed by means of a method embodying the present invention.

What is often missed in a multilevel hierarchical structure is that although slices of the secret have been allocated, these do not need to be evenly distributed and further, the ownership of subgroups does not need to mirror that of other levels. In FIG. 3 there is a seemingly powerful block controlling 45% of the total number of shares in 75% of the threshold. If the lower-level allocation of the shares is then considered, the scenario becomes far more complex. It is possible to create cross-ownership with individuals holding voting shares in multiple levels and positions on the table.

The distributions in Table 3 are defined as (Shares held, Threshold, Allocation {n}).

From the table above (3), it can be seen that participants P1 and P2 each hold sway over the votes but that the coalition with participant P4 provides either P1 or P2 with a sufficient voting block as long as P1 or P2 does not veto the vote.

As there are no limits to the implementation and structure of the voting format in the present invention, this can be used to create any organisational hierarchy that can be imagined as well as ensuring secure backup and recovery methodology.

TABLE 3

Hypothetical organisation structure

| Participant | Level 0 | Level 1 | S.Votes (Max) | S.Votes (min) |
|---|---|---|---|---|
| P1 | $D_{LO_2}$ (15, 61, 100) | $D_{1A}$ (5, 6, 10) $D_{2A}$ (3,8,10) | 70 | 15 |
| P2 | $D_{L1}$ (15, 61, 100) | $D_{1B}$ (5, 6, 10) $D_{2B}$ (3, 8, 10) | 70 | 15 |
| P3 | $D_{L2}$ (15, 61, 100) | | 15 | 0 |
| P4 | | $D_{2C}$ (6, 8, 10) | 10 | 0 |

The result is that it is possible to have veto powers and voting rights that are assigned to higher level signing shares. In the present example ownership of the shares in S could be held at $D_{LO_2}$, $D_{1A}$ and $D_{2A}$.

Secure Multi-Party Computation

Secure multi-party function computation with n participants, $p_{(1)}, \ldots, p_{(i)}, \ldots, p_{(n)}$ is a problem based on the need to assess a function $F(x_1, \ldots, x_i, \ldots, x_n)$, involving $x_{(i)}$, a secret value provided by $p_{(i)}$ that is required to be maintained in confidence such that no participant $p_{(j \neq i)}$ or external party gains any knowledge of $x_{(i)}$. Hence, the objective is to preserve the confidentiality of each participant's values while being able to guarantee the exactness of the calculation.

In this scenario, the trusted third-party T collects all the values $x_{(i:1 \ldots n)}$ from the various participants $p_{(i:1 \ldots n)}$ and returns the calculation. This design works only in an idealised world where it is possible to implicitly trust T. Where there is any possibility that T could either be malicious, rogue or compromised, the use of a trusted third party becomes less viable. This scenario mirrors existing elections where the participants are the voters, and the trusted third party is played by government.

It has been proven [Bar-Ilan, 1989] that any value that can be computed in a secure manner using a trusted third-party may also be calculated without a trusted party while maintaining the security of the individual secrets $x_{(i)}$. The protocols presented herein are secure against private computation and provide secure computation even where a non-threshold group of compromise participants can collaborate.

Simple Multiplication

Where there are two secret values, x and y that are distributed among n participants $p_{(i:1 \ldots n)}$, it is possible to compute the product xy while simultaneously maintaining the secrecy of both input variables x and y as well as ensuring that the individual secrets $x_{(i:1 \ldots n)}$ and $y_{(i:1 \ldots n)}$ are maintained by participant $p_{(i)}$ retaining the confidentiality.

In this scheme, x and y are each shared between a threshold group of participants using a polynomial of degree (k−1). Each participant $p_{(i)}$ can multiply their share of $x_{(i:1 \ldots n)}$ on a polynomial of degree (k−1) of x and $y_{(i:1 \ldots n)}$ in a polynomial of degree (k−1) on y.

Introducing Algorithm 2, returns the participant $p_{(i)}$ share of $z_{(i)}$, a polynomial of degree (2k−1). With this value, each participant $p_{(i)}$ calculates the value $x_{(i)}y_{(i)}+z_{(i)}$.

The return value for $x_{(i)}y_{(i)}+z_{(i)}$ represents a valid share of the calculation for x·y on a polynomial of degree (2k−1). Any participant or a coordinator acting for the threshold number of shares can use the return value held by each participant to calculate the true value of x·y without obtaining any knowledge of the individual shares.

Simple Addition

Where there are two secret values, x and y that are distributed among n participants $p_{(i:1 \ldots n)}$, it is possible to compute the sum x+y while simultaneously maintaining the secrecy of both input variables x and y as well as ensuring that the individual secrets $x_{(i:1 \ldots n)}$ and $y_{(i:1 \ldots n)}$ that are maintained by participant $p_{(i)}$ retain the confidentiality.

As per the process for simple multiplication, each participant $p_{(i)}$ calculates the value $x_{(i)}+y_{(i)}+z_{(i)}$. The calculation of $z_{(i)}$ is not necessary, but adds a further level of randomness and confidentiality to the process.

The return value for $x_{(i)}+y_{(i)}+z_{(i)}$ represents a valid share of the calculation for x+y on a polynomial of degree (2k−1). Any participant or a coordinator acting for the threshold number of shares can use the return value held by each participant to calculate the true value of x+y without obtaining any knowledge of the individual shares.

If the participants are less hostile, this can be simplified as an $x_{(i)}+y_{(i)}$ addition without the additional step.

Inverse or Reciprocal

For a distributed secret value, x mod n which is distributed confidentially between j participants as $x_{(i:1 \ldots j)}$, it is possible to generate shares of the polynomial associated with the value for $x^{-1}$ mod n while not revealing any information that could disclose the values $x_{(i)}$, x or $x^{-1}$ [Gennaro, 1996]. Again, each participant $p_{(i)}$ maintains a share of the value x represented by $x_{(i)}$ over a polynomial of degree (k−1).

Using Algorithm 1, each participant creates a share $x_{(i)}$ of an unknown secret x·y on a polynomial of degree (k−1). Each participant then runs Algorithm 2 to calculate (k−1) of a zero secret on a polynomial of degree (2k−1). Each participant (2k−1) performs the calculation to compute the value $x_{(i)}y_{(i)}+z_{(i)}$.

Using the Interpolate( ) routine presented above, each participant can calculate the value of $\mu = x_{(i)}y_{(i)}+z_{(i)}$ returning the value $\mu$ from the collected values of $\mu_i$. Each participant can then calculate the value of $\mu^{-1}$ mod n.

These values are sufficient such that any participant $p_{(i)}$ can compute the associated share of $x_i^{-1}$ using $\zeta_i = \gamma_i \mu^{-1}$ on a polynomial of degree (2k−1). The Berlekamp-Welch decoding scheme [Berlekamp, 1968] provides one of several methods that can be used to complete this process.

Assignment

The ability to sign a transaction in a verifiable and provable manner provides the opportunity to prove ownership privately and even relinquish or exchange ownership of the Bitcoin private key and associated bitcoin address without publicly moving anything on the Blockchain. In this manner, a Bitcoin address can be funded, and the contents of that address may be transferred or sold without leaving a public record. As this process is a threshold system, the assignment of key slices can be achieved securely without further settlement recorded on the Blockchain.

In this way, it is possible to separate the ownership of a note already settled on the Blockchain from the process of transacting that note.

CLTV

A Bitcoin message or in more common parlance, transaction, can be created with the inclusion of a CLTV [BIP 65] entry. With this addition, the transaction can be made recoverable even in the event of catastrophic loss of all key slices or if multiple slices from an entity are deemed untrustworthy or lost in a manner that does not allow for the secure reconstruction of a signature with a minimum threshold.

This is further possible where an entity is using a third-party service and desires to ensure that that service cannot hold or deny access to the keys. In constructing a Bitcoin transaction with a time based fail safe, the user knows that a malicious third-party or a compromised exchange site or bank cannot extort them for access to their keys. As a worst-case scenario, the compromise to a catastrophic level would lead to the time-based reversal of a transaction to a predefined address based on a CLTV condition. This predefined address can be created using the protocols disclosed within this application. As such, it is possible to construct a series of transactions and keys that cannot be readily compromised.

Security Considerations

Benger et. al. (2014) offered one example of ECDSA private key recovery using a Flash and reload methodology. This occurrence is but one example of attacks against system RAM and Cache. These methods leave the use of procedures such as that of Shamir's SSS [1979] wanting as they reconstruct the private key. Moreover, in any scenario in which a private key is reconstructed at any time, a requirement for trust is introduced. It is necessary in this scenario to rely on the systems and processes of the entity holding the private key.

Even if the trusted party is not malicious, there is a necessity to rely on their processes. As has been seen from many recent compromises, this reliance on reconstructing the private key leaves avenues of attack.

As both a drop-in replacement for the existing ECDSA implementations as well as being completely transparent and compatible with the current bitcoin protocol, no hard fork or soft fork is required for its implementation, and the implementation is indistinguishable from any current transaction. The present invention can treat individuals as separate participants allowing for the group signing of keys with a recovery function. As an example, a two of two scheme can be implemented using four key slices where the online wallet provider or exchange maintains two key slices and the end user maintains two slices. The exchange and the user would each have a two of two process over their key slices which would then be used in conjunction with each other for the secure signing of a message when required.

Figure 4:
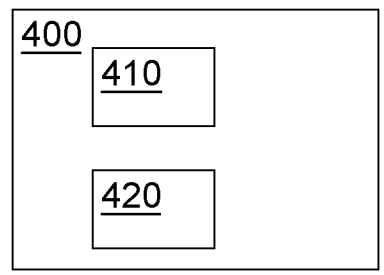
FIG. 4 shows a representation of a script of a blockchain transaction for use in a method of the present invention.

Referring to FIG. 4, a script 400 for use in a blockchain transaction such as a Bitcoin transaction requires each of a first signature 410 and a second signature 420 in order to execute the transaction.

Figure 5:
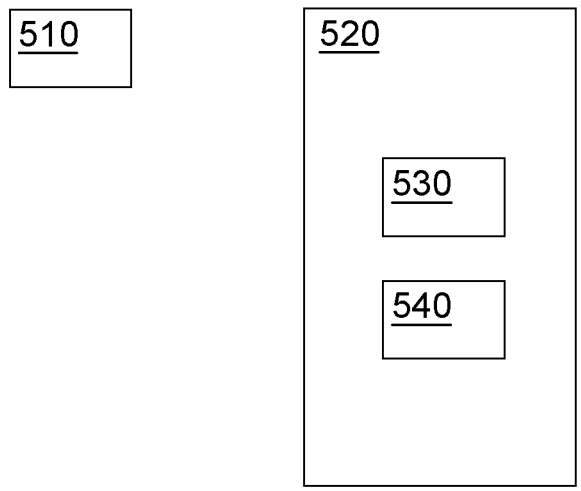
FIG. 5 shows details of a first signature for use with the script of FIG. 4.

Referring now to FIG. 5, the first signature 410 of the transaction of FIG. 4 is split into a 3 of 4 multisignature arrangement, by means of Algorithm 1 disclosed above, in which any 3 of 4 key shares are required in order to effect the first signature 410 of the transaction of FIG. 4. The 4 key shares are distributed such that a user has a key share 510, two separate entities of an exchange 520 (for example, an exchange function and its clearing office function) each have a respective key share 530, 540, and a separate escrow operation has a key share 550.

Figures 6A, 6B:
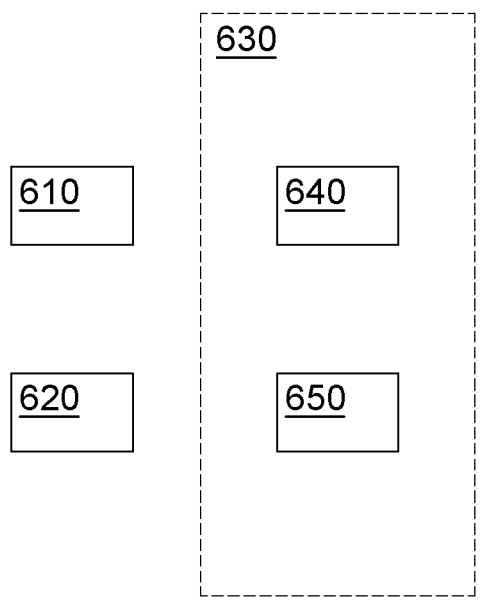
FIG. 6A shows details of a first embodiment of a second signature for use with the script of FIG. 4.
FIG. 6B shows details of a first embodiment of a second signature for use with the script of FIG. 4.

As shown in FIG. 6A, the second signature 420 of the transaction of FIG. 4 is split into a 2 of 3 multisignature arrangement, by means of Algorithm 1 described above, or a method as described in WO 2017/145010, in which any 2 of 3 key shares are required in order to effect the second signature 420 of the transaction of FIG. 4. The 3 key shares are distributed such that the user having key share 510 of the first signature 410 of the transaction of FIG. 4 also has key share 610 stored on a mobile telephone and a key share 620 on a smart card, while the exchange 520 of FIG. 5 having key shares 530, 540 of first signature 410 of the transaction of FIG. 4 also has a key share 630 of the second signature 420 of the transaction of FIG. 4. By distributing the keys of separate signatures 410, 420 of the transaction of FIG. 4 between the various parties in this way, this improves the security of the system by making collaboration between any of the parties to effect unauthorised signatures significantly more difficult, without significantly increasing the amount of resources required to effect this improvement in security.

FIG. 6B shows an alternative embodiment of the arrangement of FIG. 6A, in which features common to that embodiment are denoted by the same reference numerals. In the arrangement of FIG. 6B, the key share 630 of the embodiment of FIG. 6A can be replaced by a pair of key shares 640, 650, the key share 640 remaining with the exchange 520 of FIG. 5, while placing control of the key share 650 with a separate entity, such as the separate escrow operation.

Concluding Remarks

The present invention forms the foundation of what Bitcoin sought to achieve with the introduction of a group signature process. The addition of a fault tolerable signing system with the coupling of a distributed key creation system removes all centralisation and trust requirements.

Moreover, the introduction of an implicitly decentralised system allows for the creation of more robust and resilient protocols. The compatibility between ECDSA [Johnson, 2001] and Shamir's SSS [Shamir, 1979] has allowed the present invention to introduce a system that extends Bitcoin with a new verifiable secret sharing scheme. This system is far more efficient than anything derived by Feldman [Feldman, 1987] or Pedersen [Pedersen, 1992] while losing nothing in security.

In the present application, a system has been described that extends the functionality of Bitcoin without the requirement for a change in the base protocol. Using the present invention:

1. a trusted third-party is no longer required for the selection or distribution of a key secret,
2. a distributed banking exchange system can be created that does not rely on third-party trust,
3. each member or group of members may independently verify that the share of the secret key that is held corresponds to the Bitcoin address and public key advertised,
4. a protocol exists to refresh the private key slices to mitigate the effects of eavesdropping and related attacks, and
5. no trusted third-party is required for the group signing of transactions and messages.

As the present invention prevents sensitive data from ever appearing in memory, it completely solves many extant security risks.

REFERENCES

1) Bar-Ilan, J. Beaver, "Non-Cryptographic Fault-Tolerant Computing in a Constant Number of Rounds", Proc. of 8th PODC, pp. 201-209, 1989.
2) Berlekamp, Elwyn R. (1968), Algebraic Coding Theory, McGraw-Hill, New York, NY.
3) Benger, N., van de Pol, J., Smart, N. P., Yarom, Y.: "Ooh Aah . . . Just a Little Bit": A Small Amount of Side Channel Can Go a Long Way. In: Batina, L., Robshaw, M. (eds.) Cryptographic Hardware and Embedded Systems CHES 2014, LNCS, vol. 8731, pp. 75-92. Springer (2014)
4) Ben-Or, M., Goldwasser, S., Wigderson, A.: "Completeness theorems for noncryptographic fault-tolerant distributed computation". In: Proceedings of the Twentieth Annual ACM Symposium on Theory of Computing. pp. 1-10. STOC '88, ACM, New York, NY, USA (1988)
5) BIP 65 OP_CHECKLOCKTIMEVERIFY https://github.com/bitcoin/bips/blob/master/bip-0065.mediawiki
6) Chaum, David (1983). "Blind signatures for untraceable payments" (PDF). Advances in Cryptology Proceedings of Crypto. 82 (3): 199-203.
7) Dawson, E.; Donovan, D. (1994), "The breadth of Shamir's secret-sharing scheme", Computers & Security, 13: Pp. 69-78
8) Desmedt. Yuo (1987). "Society and Group Oriented Cryptography: A New Concept". In A Conference on the Theory and Applications of Cryptographic Techniques on Advances in Cryptology (CRYPTO '87), Carl Pomerance (Ed.). Springer-Verlag, London, UK, UK, 120-127.
9) Feldman. P. "A practical scheme for non-interactive verifiable secret sharing". In Proceedings of the 28th IEEE Annual Symposium on Foundations of Computer Science, pages 427-437, 1987.
10) Gennaro, R., Jarecki, S., Krawczyk, H., Rabin, T.: "Robust threshold DSS signatures". In: Proceedings of the 15th Annual International Conference on Theory and Application of Cryptographic Techniques. pp. 354-371. EUROCRYPT'96, SpringerVerlag, Berlin, Heidelberg (1996)
11) Ibrahim, M., Ali, I., Ibrahim, I., El-sawi, A.: "A robust threshold elliptic curve digital signature providing a new verifiable secret sharing scheme". In: Circuits and Systems, 2003 IEEE 46th Midwest Symposium on. vol. 1, pp. 276-280 (2003)
12) Johnson, D., Menezes, A., Vanstone, S.: "The elliptic curve digital signature algorithm (ecdsa)". International Journal of Information Security 1(1), 36-63 (2001)
13) Kapoor, Vivek, Vivek Sonny Abraham, and Ramesh Singh. "Elliptic Curve Cryptography." Ubiquity 2008, no. May (2008): 1-8.
14) Knuth, D. E. (1997), "The Art of Computer Programming, II: Seminumerical Algorithms" (3rd ed.), Addison-Wesley, p. 505.
15) Koblitz, N. "An Elliptic Curve Implementation of the Finite Field Digital Signature Algorithm" in Advances in Cryptology—Crypto '98. Lecture Notes in Computer Science, vol. 1462, pp. 327-337, 1998, Springer-Verlag.
16) Liu, C. L. (1968), "Introduction to Combinatorial Mathematics", New York: McGraw-Hill.
17) National Institute of Standards and Technology: FIPS PUB 186-4: "Digital Signature Standard" (DSS) (2003)
18) Pedersen, T.: "Non-interactive and information-theoretic secure verifiable secret sharing". In: Feigenbaum, J. (ed.) Advances in Cryptology—CRYPTO '91, LNCS, vol. 576, pp. 129-140. Springer (1992)
19) Rabin T. & Ben-Or. M. (1989) "Verifiable secret sharing and multiparty protocols with honest majority". In Proc. 21st ACM Symposium on Theory of Computing, pages 73-85, 1989.
20) Shamir, Adi (1979), "How to share a secret", Communications of the ACM, 22 (11): Pp. 612-613
21) Wright, C. & Savanah, S. (2016) "Determining a common secret for two Blockchain nodes for the secure exchange of information" Application Number: WO 2017/145016. 2016: n. pag. UK It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A method of digitally signing a digital message by means of a private key of a public-private key pair of a cryptography system, to provide a digital signature that can be verified by means of a public key of the public-private key pair, the method comprising:

receiving at least a threshold number of partial signatures of said digital message, wherein each said partial signature includes a respective first part based on the message and a respective second part based on a respective share of the private key, wherein each said share of the private key comprises the sum of a respective previous share of the private key and a respective share of a zero secret value, wherein the private key is accessible to said threshold number of shares of the private key and is inaccessible to less than said threshold number of shares, wherein each said partial signature corresponds to a respective value of a first polynomial function such that the first polynomial function is accessible to said threshold number of partial signatures and is inaccessible to less than said threshold number of partial signatures; and determining said first polynomial function, by means of determining coefficients of the first polynomial function from a plurality of known values of said partial signatures, to effect the digital signature of the message.

2. The method according to claim 1, wherein the step of determining said first polynomial function comprises executing an error correction algorithm.

3. The method according to claim 1, wherein the step of determining said first polynomial function comprises executing a Berlekamp-Welch decoding algorithm.

4. The method according to claim 1, wherein the step of determining said first polynomial function comprises:

defining an error locator polynomial function and a second polynomial function, wherein the second polynomial function is a product of said first polynomial function and said error locator polynomial function, determining coefficients of said second polynomial function and said error locator polynomial function from a plurality of known values of said partial signatures, and determining said first polynomial function from said second polynomial function and said error detector polynomial function, to effect the digital signature of the message.

5. The method according to claim 1, wherein each said partial signature further includes a respective fourth part based on a respective share of an ephemeral key, wherein the ephemeral key is accessible to said threshold number of said shares of said ephemeral key and is inaccessible to less than said threshold number of shares.

6. The method according to claim 1, wherein the cryptography system is an elliptic curve cryptography system.

7. The method according to claim 6, further comprising:

distributing at least one respective first share of a first secret value, known to a first participant, to each of a plurality of second participants, wherein said first shares are encrypted by means of at least one private-public key pair comprising a private key and a public key being an elliptic curve generator point multiplied by the private key, wherein a first threshold number of first shares is required in order to enable a said second participant to determine the first secret value;

receiving, from each of a plurality of said second participants, at least one second share of a respective second secret value known to said second participant, wherein said second shares are encrypted by means of at least one private-public key pair comprising a private key and a public key being an elliptic curve generator point multiplied by the private key, and a second threshold number of second shares is required in order to enable a participant other than said second participant to determine the second secret value; and forming, from a plurality of said second shares, a third share of a third secret value, wherein a third threshold number of third shares is required in order to enable the third secret value to be determined.

8. The method according to claim 7, wherein said first threshold value is equal to said second threshold value and/or said second threshold value is equal to said third threshold value and/or said third threshold value is equal to said first threshold value.

9. The method according to claim 7, further comprising enabling encrypted communication between said first participant and each of a plurality of said second participants.

10. The method according to claim 7, wherein the first and second shares of said first and second secret values are created by means of respective Shamir secret sharing schemes.

11. The method according to claim 7, wherein a plurality of said third shares are respective values of a fifth polynomial function, and the third secret value can be determined by deriving the fifth polynomial function from said third threshold number of said values.

12. The method according to claim 7, further comprising communicating a respective said first share, multiplied by an elliptic curve generator point, to each of a plurality of said second participants.

13. The method according to claim 7, further comprising receiving at least one respective said second share, multiplied by an elliptic curve generator point, from each of a plurality of said second participants.

14. The method according to claim 7, further comprising receiving from at least one said second participant at least one fourth share of a fourth secret value, having value zero, wherein said fourth share is encrypted by means of at least one private-public key pair comprising a private key and a public key being an elliptic curve generator point multiplied by the private key.

15. The method according to claim 7, further comprising receiving from at least one third participant, different from the or each said second participant, at least one fourth share of a fourth secret value, having value zero, wherein said fourth share is encrypted by means of at least one private-public key pair comprising a private key and a public key being an elliptic curve generator point multiplied by the private key.

16. The method according to claim 9, wherein said encrypted communication is enabled by means of a respective common secret determined by said first participant and each of said plurality of second participants independently of said first participant.

17. The method according to claim 16, wherein said first participant updates a private key and updates a respective public key associated with each of said plurality of second participants, and each of said plurality of second participants updates a respective private key and a public key associated with said first participant.

18. The method according to claim 17, wherein said keys are updated on the basis of data agreed upon between said first participant and the corresponding said second participant.

19. The method according to claim 13, further comprising verifying consistency of at least one said second share received directly from at least one said second participant with at least one said second share, multiplied by the elliptic curve generator point, received from at least one further said second participant.

20. The method according to claim 13, wherein at least one said second share is a value of a respective sixth polynomial function, and the corresponding second secret value can be determined by deriving the corresponding sixth polynomial function from the corresponding second threshold number of said values.

21. The method according to claim 13, further comprising verifying consistency of said first secret value with a plurality of said first shares, multiplied by said elliptic curve generator point, received from a plurality of said second participants.

22. The method according to claim 19, further comprising updating said third secret value on the basis of said verification step.

23. The method according to claim 20, further comprising receiving at least one coefficient of a respective said sixth polynomial function, multiplied by an elliptic curve generator point, from each of a plurality of said second participants.

24. The method according to claim 23, further comprising verifying consistency of at least one said second share received directly from at least one said second participant with at least one said second share, multiplied by the elliptic curve generator point, received from at least one further said second participant, wherein said verification step comprises reconstructing said sixth polynomial function, multiplied by the elliptic curve generator point, from said coefficients, multiplied by the elliptic curve generator point.

25. The method according to claim 21, further comprising updating said third secret value on the basis of said verification step.

26. The method according to claim 21, wherein said verifying step comprises obtaining from a plurality of said second shares, multiplied by the elliptic curve generator point, said second secret value, multiplied by the elliptic curve generator point, by means of a method which, when applied to said plurality of second shares, provides said second secret value.

27. The method according to claim 14, further comprising verifying consistency of a plurality of said fourth shares, multiplied by said elliptic curve generator point, with a zero fourth secret value.

28. The method according to claim 14, further comprising forming, from said third share and said fourth share, a fifth share of said third secret value, wherein a fourth threshold number of fifth shares is required in order to enable the third secret value to be determined.

29. The method according to claim 27, further comprising updating said third secret value on the basis of said verification step.

30. The method according to claim 27, wherein said verifying step comprises obtaining from a plurality of said fourth shares, multiplied by the elliptic curve generator point, said fourth secret value, multiplied by the elliptic curve generator point, by means of a method that, when applied to said plurality of fourth shares, provides said fourth secret value.

31. The method according to claim 1, wherein the message is a blockchain transaction.

32. A computer-implemented system, comprising:
at least one a processor; and
memory including executable instructions that, as a result of execution by the at least one processor, cause the system to perform the method according to claim 1.

* * * * *